United States Patent [19]

Cole

[11] 3,813,917

[45] June 4, 1974

[54] METHOD AND APPARATUS FOR MEASURING STRIP MATERIAL KINETIC FRICTION

[75] Inventor: Pleasant Taswell Cole, Goleta, Calif.

[73] Assignee: Applied Magnetics Corporation, Goleta, Calif.

[22] Filed: May 18, 1971

[21] Appl. No.: 144,588

[52] U.S. Cl. .................................. 73/9, 336/135
[51] Int. Cl. .......................................... G01n 19/02
[58] Field of Search ............ 73/9, 10, 134; 336/135

[56] References Cited
UNITED STATES PATENTS

| | | | |
|---|---|---|---|
| 2,419,979 | 5/1947 | Wilson | 336/135 X |
| 2,700,896 | 2/1955 | Root | 73/134 X |
| 3,360,978 | 2/1968 | Shinn | 73/9 |
| 3,544,939 | 1/1969 | Bath | 336/136 |
| 3,552,198 | 1/1971 | Friedland | 73/9 X |

Primary Examiner—Richard C. Queisser
Assistant Examiner—Daniel M. Yasich
Attorney, Agent, or Firm—Daniel J. Meaney, Jr.

[57] ABSTRACT

Apparatus for measuring kinetic friction between a selected surface of a strip material and metal surface having a rotatable metal outer member and an inner surface of magnetic material, adapted to be rotated in an angle determined by the amount of kinetic friction, across an E-shaped transformer core to vary the magnetic flux path and magnetic coupling between the primary and secondary windings thereof which windings produce an analog voltage output signal which varies in amplitude as the magnetic material is rotated in proportion to the kinetic friction, capable of being used as an input signal to visual displays, chart recorders or control circuits is shown. A method for measuring such kinetic friction with a linear transformer is shown.

24 Claims, 7 Drawing Figures

PATENTED JUN 4 1974　　3,813,917
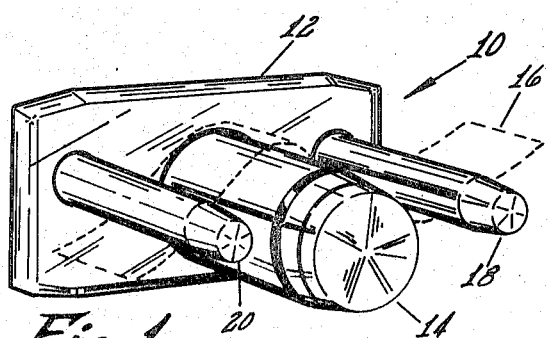
Fig.1
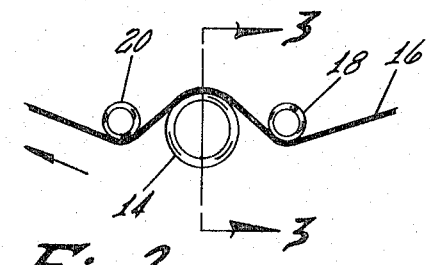
Fig.2
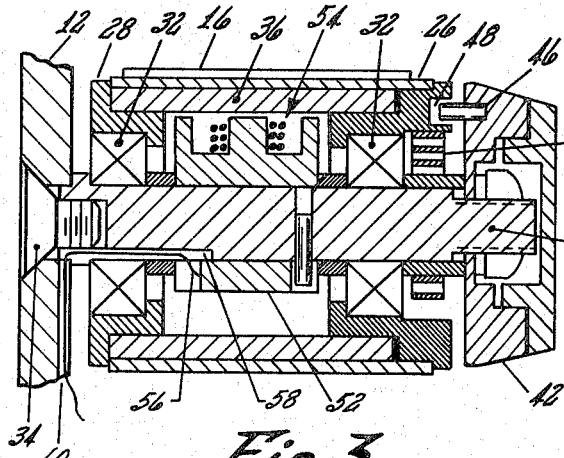
Fig.3
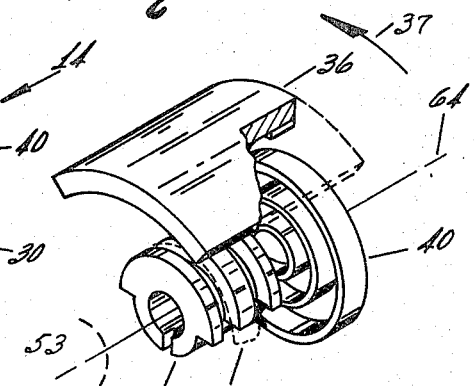
Fig.4
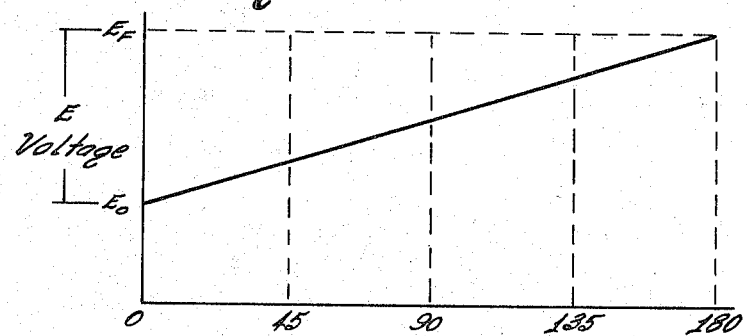
Degrees Rotation - Fig.5
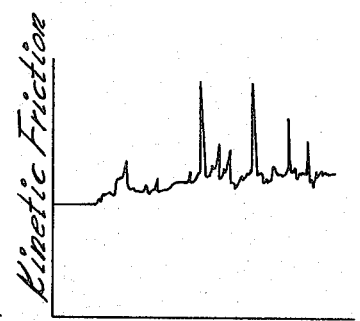
Tape Length
Fig.6
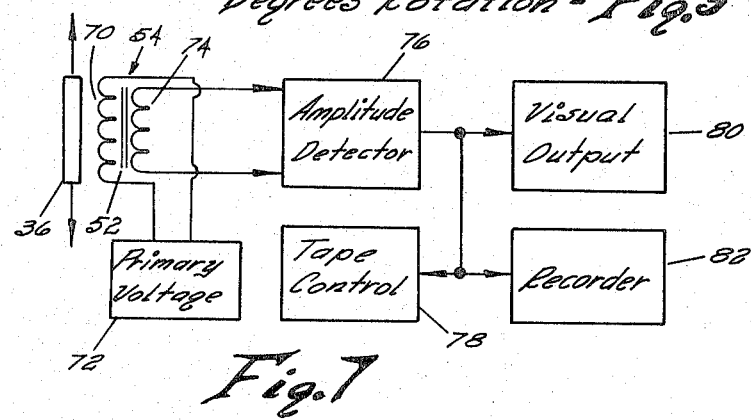
Fig.7
INVENTOR.
Pleasant Taswell
Cole
BY Daniel J. Meaney Jr

METHOD AND APPARATUS FOR MEASURING STRIP MATERIAL KINETIC FRICTION

Performance and reliability of a magnetic tape transport are directly related to performance of the magnetic transducing head to tape contact and the physical properties of the magnetic tape used therein. It is known that during operation the magnetic oxide surface of a magnetic tape slidably engages and slowly abrades the contacting surface of the magnetic transducing head.

Reduction of the abrasive effects of the tape on the head is accomplished by controlling head-to-tape tension, the physical properties of the tape and other such techniques.

The coefficient of kinetic friction of the magnetic oxide coating and the magnetic transducing head has been determined as one important factor contributing to such headware. Specifically, it has been determined that the coefficient of kinetic friction of a magnetic oxide coating of a magnetic tape in slidable engagement with a metal surface can be measured dynamically, and the effects thereof on head wear controlled. By knowing that the kinetic friction levels of tape to be used in magnetic recording/reproducing apparatus can vary widely, it is now possible to select a magnetic tape having a low coefficient of kinetic friction.

Further, by using the teachings of this invention, the coefficient of kinetic friction of a strip material, e.g., magnetic recording tape, can be dynamically measured using several types of metal surfaces. By so doing, the level of kinetic friction and the variances in kinetic friction of the tape can be measured and observed. By selecting tapes having both a low level of kinetic friction and one wherein the variances in such friction are at a minimum over the entire length of tape, tape flutter, tape skew across the transducing head and excessive wearing of the transducing head can be minimized.

It is known in the prior art that the static friction, i.e., the friction which must be overcome to permit initial tape movement, can be measured. The technique includes placing the selected surface of a strip material in contact with a known metal surface, applying a known weight on the strip material, and applying a measured tension force to the tape until movement commences. By means of this technique, the coefficient of static friction can be determined with some degree of accuracy.

However, a relatively accurate and simple method and apparatus for dynamically measuring the coefficient of kinetic friction of a strip material, such as a magnetic tape, has not been known prior to this invention. For example, the method and apparatus of this invention have been successfully utilized to measure kinetic friction of computer and analog magnetic recording tapes.

One advantage of the present invention is that the kinetic friction of the entire length of a tape can be continuously measured during use thereof in a magnetic recording/reproducing apparatus.

Another advantage of the present invention is that the apparatus and components thereof for accomplishing the measurements eliminates the need for rotating sliding coils, sliding contacts and other electrical-mechanical contacting components normally required for making dynamic measurements.

Another advantage of the present invention is that one can determine the physical characteristics of a strip material prior to use thereof and over the entire length thereof.

These and other advantages will become readily apparent when considered in light of the preferred embodiment described herein taken together with the following drawing wherein:

FIG. 1 is a perspective view of one embodiment of magnetic tape kinetic friction measuring apparatus adapted to be installed on and be part of a magnetic tape recording/reproducing apparatus;

FIG. 2 is a front view of the apparatus of FIG. 1 showing the relationship between the kinetic friction measuring component, the tape guides and tape.

FIG. 3 is a section taken along lines 3 — 3 of FIG. 2 showing the interior assembly of the kinetic friction measuring component;

FIG. 4 is a pictorial representation in isometric form showing the essential components of and the relationship therebetween of the preferred embodiment;

FIG. 5 is a graph of the analog voltage output signal produced by the kinetic friction measuring component plotted as a function of degrees of rotation of a magnetic material member which rotation is proportional to the kinetic friction between a strip material surface and a known metallic surface;

FIG. 6 is a graph of kinetic friction of a sample of magnetic tape plotted as a function of length of tape; and FIG. 7 is a block diagram, partially in schematic diagram, of the electrical circuit components used in one embodiment of the present invention.

FIG. 1 illustrates one embodiment of a kinetic friction measuring apparatus, generally designed as 10, adapted to be mounted on a tape transport (not shown). The apparatus 10 has a back plate 12 which supports a kinetic friction measuring component 14, which is adapted to be positioned transverse to the predetermined path of travel of a strip material, e.g., magnetic tape, shown as a dashed tape 16. A pair of tape rollers 18 and 20 are positioned, one on each side of the measuring component 14.

The front view of FIG. 2 discloses that the axis of the tape rollers 18 and 20 are substantially parallel to the axis of the measuring component 14. In this example, the strip material 16 is moving right to left and the tape rollers 18 and 20 are means for defining a predetermined path of travel for the moving strip material 16.

FIG. 3 is a section taken along line 3 — 3 of FIG. 2 showing the assembly details of a preferred embodiment of the kinetic friction measuring component 14.

The measuring componetn 14 can be characterized as an arcuate-shaped rotatable transforming means. An arcuate-shaped outer member 26 forms the peripheral outer surface of the component 14 which is in slidable engagement with a selected surface of the strip material 16, e.g., the magnetic oxide coating of a magnetic tape 16. The outer member 26 is supported by an arcuate-shaped support 28 which is rotatably mounted on a fixed shaft 30 by means of bearings generally designated by 32. The shaft 30 may be fixed to the back plate 12 by a fastener 34. This mounting arrangement permits the outer member 26 to be rotated in the direction of travel of the moving strip material 16 and about an axis transverse to the direction of travel of the moving strip material 16.

The outer member 26 may be of any known metallic material, such as for example, type 303 Stainless Steel, commercial free-turning brass or 6061 type aluminum. It is apparent, regardless of the amount of rotation of the outer member 26, the surface thereof will always be the same material in slidable engagement with the selected surface of the strip material 16. In this manner a uniform kinetic friction force can be developed and measured.

An arcuate-shaped inner member 36, formed of a magnetic material, is operatively connected to and co-axially aligned with the outer member 26 and the support 28. In this embodiment, the support 28 and inner member 36 are an integral component, that is, inner member 36 is secured to support 28 and is movable therewith. The outer member 26 is removable and is a separate element which may be slipped into the integral component formed of support 28 and inner member 36 enabling many different metal surfaces to be used. Arcuate shaped inner member 36 may be all of or a portion of the outer wall of a hollowed out, thin walled, cylindrical shaped member.

The inner member 36 may be of any magnetic material such as for example ferrite, HyMu 80 or permalloy.

Since the outer member 26 and the inner member 36 are removably assembled together, both members, as an assembled unit, are capable of being simultaneously rotated, relative to the axis transverse to the direction of travel of the moving strip material 16, the angle of rotation being determined by the coefficient of kinetic friction developed by the selected surface of the strip material 16 and the outer surface of member 26.

In order to determine the kinetic friction force and to prevent continual rotation of the outer member 26 about its axis, a resilient means or spring means, such as a flat helical spring 40, is attached to support 28 and the shaft 30. The direction of spring tension or spring force is in a direction opposite to the direction of travel of the tape. During operation, the spring force and kinetic force become balanced at some angle of rotation. By selection of spring material, spring stiffness, $k$ factor and winding characteristics, the exact spring force can be produced.

In the embodiment of FIG. 3, a cover 42 is rotatably attached or threaded to the shaft 30 by means of a lock washer 44 such that a stop limit means or dowel 46 fits into a slot 48 in support 28. The dowel 46 and slot 48 are of geometrical dimension to limit the rotation of the outer member 26 in the same direction as the spring force of spring 40. Thus, in the preferred embodiment the tape kinetic friction is measured in one direction. However, it is contemplated that the measuring component can be constructed to measure in either direction of tape travel if desired.

Also attached to the shaft is a fixed arcuate-shaped transformer which in this embodiment has an E-shaped core 52 axially aligned with the outer member 26 and the inner member 36. The E-shaped is formed of a magnetic material, such as ferrite, HyMu 80 or permalloy or the like. This core can be characterized as formed by an E being rotated in a semi-circle around and spaced a predetermined distance from the common axis of the outer member 26 and inner member 36. The outer surface of core 52 is spaced in the order of 0.002 inches from inner member 36. Primary and secondary windings, designated by 54, are wound on the E-shaped core 50 as shown in FIG. 3. Leads 56 extend from windings 54 through a slot 58 in shaft 30 and slot 60 in back plate 12. Leads 56 are adapted to be connected to an output circuit means such as, for example, as described in connection with FIG. 7 hereinafter.

FIG. 4 illustrates, pictorially, the components and functional relationship therebetween. In this illustration the inner member 36 is semi-cylindrical in shape and co-axially aligned with outer member 26 (see FIG. 3) about the center line 64 forming the axis. The E-shaped core 52 has the primary and secondary winding 54 (see FIG. 3) wound in the slots formed by each leg of the E core as shown by dashed line 66. In this embodiment, the inner member 36 is shown in maximum coupling position. Minimum coupling position would be with inner member 36 rotated counter-clockwise about 180°. The graph of FIG. 5 illustrates the analog voltage output signal from the windings 54 plotted as a function of degrees of rotation of the inner member 36.

Functionally, inner member 36 forms part of the magnetic flux path of the transformer core 52. In this embodiment, the angle of rotation is determined to be the number of degrees of rotation of magnetic sector 36 in the direction shown by the solid arrow 37 of FIG. 4 relative to fixed transformer core 52 which is in turn secured to shaft 30. As shown in FIG. 5, the angle of rotation is defined to be the angle traversed by the inner member 36 in rotating about axis 64 from its quiescent position prior to being placed in slidable engagement with the strip material 16 to its dynamic position determined when the strip material 16 is in slidable engagement with inner member 36. When inner member 36 is in minimum coupling position the output signal from the winding is at a minimum and may be designated as $E_o$ as shown in FIG. 5. As the angle of rotation goes from 0° (reference) to 180°, the output signal increases in a linear relationship until maximum coupling occurs when the inner member 36 covers the core 52. This is designated as $E_f$ in FIG. 5.

As the coefficient of kinetic friction between the selected surface of the strip material and the metal outer surface varies, the angle of rotation varies directly in proportion thereto. Thus, a linear relationship exists which is depicted by an analog voltage output signal wherein variations in amplitude of the analog signal are directly proportional to the changes in kinetic friction. In FIG. 5, the variance in voltage E (after rectification of AC voltage) can be controlled or plotted for each tape.

In one application, the kinetic friction measuring apparatus was used to dynamically measure the kinetic friction of a 1,000-foot piece of 0.5 inch magnetic computer tape having a magnetic oxide coating. The measurements were made at a tape speed of 15 inches per second at a tape tension of about 8 inch-ounces and with a 45° wrap around the outer surface of the outer member 26.

The graph of FIG. 6 illustrates the measured variances in kinetic energy wherein the kinetic energy varies as a function of tape length. The high peaks in the graph indicate parts of the tape having substantial differences in kinetic friction while the relatively flat portion of the graph represent the nominal dynamic kinetic friction level.

A typical output circuit means is illustrated by the block diagram of FIG. 7. The inner member 36, the core 52 and primary and secondary winding 54 are shown diagrammatically. The primary winding 70 is connected to primary voltage source 72, such as for example, 10 volt, 4KHz source. The secondary winding 74 is connected to a voltage amplitude detecting circuit 76, the output of which is a rectified into an analog voltage output signal. The analog signal can be used as an input to a tape control 78, a visual output 80 or recorder 82. The tape control 78 is contemplated to be an error-sensing circuit used for controlling the moving strip material, such as for example, tension, drawing force or heat-to-tape tension and the like. The circuitry of FIG. 7 was utilized to make the graph of FIG. 5.

The present invention may be used as a rotatable linear transducer to measure kinetic energy of any strip material. To perform the measurement function, it is essential that the strip material be in continual contact with the surface of a known metal.

The present invention also has utility as an electromechanical apparatus for producing an output signal representing the angle of positional rotation of a shaft wherein the angle of positional rotation does not exceed 180°. The inner member 36 need only be attached to the shaft. Conversely, the inner member 36 may be held stationary with the E-shaped core member 52 being attached to the shaft such that an angle of rotation occurs about longitudinal axis 64 of FIG. 4 and in the direction shown by dashed arrow 53. Of significance is that relative angle movement is required between inner member 36 and E-shaped core member 52 for generating an output signal. If the angle of shaft rotation is limited, the spring is not needed.

The method for measuring the kinetic friction basically requires the step of moving the strip material along a predetermined path while slidably engaging the outer member 26. By rotating the outer member 26 within a preselected range, for example 180°, the angle of rotation is a function of the kinetic friction. The steps of varying the magnetic flux path within inner member 36 and dynamically balancing the kinetic friction force with a resilient means results in an output signal which varies in proportion to the kinetic friction force.

The method would require limiting rotation of the outer member 26 in the event a spring is used.

What is claimed is:

1. Apparatus for measuring kinetic friction of a moving strip material comprising means for defining a predetermined path of travel for the moving strip material;

an arcuate-shaped rotatable transforming means positioned along said predetermined path and relative to said defining means enabling a selected surface of said strip material to be placed in slidable engagement with an arcuate-shaped outer member defining the outer surface of said transforming means, said outer member being capable of rotation in the direction of travel of said moving strip material and about an axis transverse to the direction of travel of said moving strip material, said transforming means comprising an arcuate-shaped inner magnetic material member operatively connected to and co-axially aligned with said outer member and being capable of being rotated therewith, the angle of rotation thereof being defined to be that angle traversed by the outer member in rotating about said axis from its quiescent position prior to being placed in slidable engagement with said strip material to its dynamic position determined by the coefficient of kinetic friction between said selected surface of the moving strip material when in slidable engagement with the outer surface of said outer member;

a fixed arcuate-shaped transformer axially aligned with said outer member and said inner member and spaced a predetermined distance from and relative to said inner member permitting portions of said inner member to rotate thereacross and form a part of the magnetic flux path of said transformer to vary the electrical signal output from said transformer as a function of the angle of rotation of said inner member and said outer member;

resilient means operatively coupled to said outer member for urging said outer member in a direction opposite to the direction of travel of said moving strip material to position a portion of the inner member across said transformer, the amount of which is determined by the frictional force and resilient means force being balanced and establishing said angle of rotation as a function of said kinetic friction; and output means operatively coupled to said transformer means for responding to the electrical signal therefrom.

2. The apparatus of claim 1 wherein said outer member is selected of a magnetic material and is cylindrical in shape and wherein said inner member is selected of a magnetic material and is semi-cylindrical in shape and co-axially aligned with said outer member, said outer member during rotation continually placing the same material in slidable engagement with said moving strip material regardless of the angle of rotation, said inner member during rotation having a minimum and maximum rotational position relative to said transformer to vary in a linear relationship the flux path and magnetic coupling of said transformer between a minimum and maximum as a function of angle of rotation of said inner member and the coefficient of friction between said selected surface of said strip material and the material forming the outer surface of said outer member.

3. The apparatus of claim 1 wherein said arcuate-shaped transformer comprises a magnetic material core formed in the shape of an E rotated in a semi-circle around and spaced a predetermined distance from the common axis of said inner member and said outer member; and a primary and secondary winding placed adjacent to each other in the slots formed between each leg forming said E core.

4. The apparatus of claim 3 wherein said transforming means produces an electrical signal therefrom which is directly proportional to the angle of rotation of said outer member and said inner member.

5. The apparatus of claim 4 wherein said output means includes an electrical detecting circuit for determining the variance in the electrical signal from said transformer.

6. The apparatus of claim 5 wherein said output means includes a control device operatively coupled to said electrical detecting circuit for controlling said moving strip material in response to control signals produced by said detecting circuit.

7. The apparatus of claim 3 wherein said resilient means is a flat spiral spring.

8. The apparatus of claim 3 wherein said outer member rotation in the direction of travel of said moving strip material varies between 0° and 180°.

9. The apparatus of claim 8 wherein said outer member rotation in the direction opposite to the direction of travel of said moving strip material is limited when the direction of travel of said moving strip material rotates the outer member in the same direction as the force of the resilient spring means.

10. The apparatus of claim 8 wherein said defining means includes at least one tape roller positioned along said predetermined path and relative to said outer member to wrap the strip material around and into slidable contact with the outer surface of said outer member.

11. The apparatus of claim 10 wherein said strip material is a magnetic tape and the magnetic oxide coating is the selected surface.

12. Means for measuring kinetic friction of a moving strip material comprising
transforming means having an outer surface positioned to slidably engage and be displaced by a selected surface of said moving strip material for generating an output signal determined by the kinetic friction between the selected surface of the strip material and the outer surface of said transforming means, said transforming means comprising
a movable means defining said outer surface and having a magnetic material embedded therein predeterminedly spaced from said outer surface:
a transforming circuit including a magnetic core and windings positioned adjacent said movable means and in cooperation therewith to permit the magnetic material to be moved in to and out of the magnetic flux path of said transformer circuit by said movable means varying the magnetic coupling coefficient thereof and the amplitude of the output signal therefrom as a function of position of said magnetic material relative to said transforming circuit;
means operatively connected to said transforming circuit and responsive to said output signal for indicating the kinetic friction of said moving strip material.

13. The means of claim 12 further comprising
means operatively connected to said transforming circuit for detecting variances in amplitude of the output signal from the said windings.

14. The means of claim 13 further comprising
visual output means operatively connected to said amplitude detecting means for visually displaying the kinetic friction in selected format.

15. The means of claim 14 further comprising
recording means operatively connected to said amplitude detecting means for recording the variances in amplitude.

16. The means of claim 15 further comprising
strip material control means operatively connected to said amplitude detecting means for responding to the variances in amplitude of the output signal to control said moving strip material.

17. A rotatable linear transducer comprising
an arcuate-shaped rotatable output member adapted to be placed in movable engagement with a strip material to measure the kinetic friction between the strip material and the outer surface of said outer member selected of a material capable of slidably supporting said strip material and being capable of rotation about a fixed shaft in response to movement of the strip material in a predetermined direction;
an arcuate-shaped inner magnetic material member operatively connected to and spaced substantially parallel to said outer member and being capable of being moved therewith, the amount of movement thereof being determined by the coefficient of kinetic friction developed between the strip material and the outer surface of said outer member;
a fixed arcuate-shaped magnetic material member defining a transformer core of a transformer secured to said fixed shaft and having a primary and secondary winding placed therein, said core being spaced a predetermined distance from said arcuate-shaped inner member permitting said inner member to be moved thereacross and cooperating therewith forming a part of the transformer core to produce a voltage output signal from said transformer which is proportional to the kinetic friction; and
spring means operatively connected to said outer member and said fixed shaft for urging the same in a direction opposite to said predetermined direction.

18. Method for measuring kinetic friction of a moving strip material comprising
moving strip material along a predetermined path over which said strip material is to be transported;

slidably engaging a selected surface of said strip material which is positioned along said predetermined path with an outer surface of a preselected material of an arcuate-shaped member having an inner magnetic material member embedded therein;
rotating within a preselected range said outer member about its axis with said moving strip material with an angle of rotation thereof being a function of the kinetic friction between the selected surface of the strip material being measured and the outer surface of said outer member;
varying the magnetic flux path of a transformer core and windings with the magnetic material as a function of the angle of rotation of the outer member producing an analog voltage output signal which varies in proportion to the kinetic friction; and
dynamically balancing the kinetic friction force with restoring force to position at equillibrium a portion of the magnetic material in coupling relationship with said transformer core;
applying said analog voltage output signal to a detecting means which is responsive thereto for indicating the measured kinetic friction of said strip member.

19. The method of claim 18 further comprising the step of
detecting the variance in amplitude of the analog voltage output signal from said transformer.

20. The method of claim 18 wherein said transformer core is in the form of an E-shaped core having primary and secondary windings located in the slots formed between the E-shaped core and wherein the analog voltage output signal therefrom varies in a linear relationship as the inner magnetic material member is moved from minimum coupling position to a maximum coupling position as a function of the kinetic friction being measured.

21. The method of claim 20 wherein the angle of rotation of said outer member ranges from 0° to 180° in a predetermined direction.

22. The method of claim 21 wherein the angle of rotation of said outer member is limited in rotation in a direction opposite to the predetermined direction.

23. An electro-mechanical apparatus for producing an output signal representing the angle of rotation of a shaft comprising an arcuate-shaped rotatable member having a magnetic segment therein operatively connected to said shaft and adapted to be rotated therewith; and a fixed arcuate-shaped transformer member having a magnetic material core formed in the shape of an E rotated in a semi-circle around and spaced a predetermined distance from the axis of said rotatable member and primary and secondary windings placed adjacent to each other in the slots formed between each leg forming said E-core; said magnetic segment of said rotatable member being capable of varying reluctance path and magnetic coupling of the transformer member and the output signal therefrom as a function of the angle of rotation of said shaft.

24. The apparatus of claim 23 comprising an output circuit electrically connected to said transformer windings and responsive to the output signal therefrom to generate a control signal representative of said angle of rotation of said shaft.

* * * * *